Patented Oct. 30, 1951

2,572,943

UNITED STATES PATENT OFFICE 2,572,943

PRODUCTION OF BIFUNCTIONAL CARBONYL COMPOUNDS FROM 1,4-DICHLOROBUTANE

Alfred L. Miller, Summit, N. J., and Bernard H. Kress, Toledo, Ohio, assignors to Celanese Corporation of America, New York, N. Y., a corporation of Delaware No Drawing. Application April 29, 1949, Serial No. 90,556

2 Claims. (Cl. 260—601)

This invention relates to the preparation of compounds containing an aldehyde group and relates more particularly to an improved process for the production of bis-diacetals, which may be readily hydrolyzed to yield the corresponding dialdehydes.

An object of this invention is the provision of an efficient and economical process for the preparation of bis-diacetals.

Another object of this invention is the production of aliphatic dialdehydes from halogenated organic compounds by converting said halogenated organic compounds to bis-diacetals followed by hydrolysis of said diacetals.

A further object of this invention is to provide a process for the production of aliphatic dialdehydes employing dihalogenated aliphatic compounds whereby the aliphatic dialdehydes obtained may be of a longer chain length than the dihalogenated aliphatic compounds employed as intermediates.

Other objects of this invention will appear from the following detailed description.

Aside from glyoxal, the aliphatic dialdehyde of lowest molecular weight, dialdehydes have not heretofore been readily available since methods for their production directly and in suitable yield have not been developed. The bifunctional character of dialdehydes, whether aliphatic, alicyclic or aromatic, renders them of great value for use in many reactions, and methods whereby said compounds may be obtained efficiently and economically and in high yield are of considerable commercial importance.

We have now found that diacetals may be readily obtained from the corresponding alpha, omega-dihalogenated aliphatic compound or dihalogenated alicyclic or aromatic compounds by converting the same to the Grignard reagent employing magnesium and a suitable solvent under anhydrous conditions, and then reacting the bifunctional Grignard reagent thus formed with an alkyl ester of orthoformic acid, such as, for example, ethyl orthoformate or methyl orthoformate to yield the corresponding aliphatic diacetal. Examples of other esters of orthoformic acid which are suitable are propyl orthoformate, isopropyl orthoformate, butyl orthoformate, isobutyl orthoformate and isoamyl orthoformate. Upon hydrolysis of the aliphatic diacetal, the desired aliphatic dialdehyde is obtained as the hydrolysis product. Furthermore, in the case of alpha, omega-dihalogenated aliphatic compounds, by maintaining rigidly anhydrous conditions, employing adequate agitation, excess dihalide, high temperatures of about 80 to 100° C. or more, a cobalt salt catalyst, and finely-divided magnesium during the preparation of the Grignard reagent, an intermediate coupling reaction may be favored whereby one mol of the Grignard reagent formed couples with one mol of the aliphatic dihalogen compound. This coupling reaction results in the formation of a Grignard reagent wherein the alkylene group in the chain is twice the length of the alkylene chain in the initial dihalogenated aliphatic compound. Magnesium dihalide is obtained as a by-product of the coupling reaction. When the Grignard reagent of increased alkylene chain length which is believed to be formed in this fashion is reacted with ethyl orthoformate, for example, the corresponding longer chain aliphatic diethyl acetal is obtained. On hydrolysis, the latter is converted to the longer chain dialdehyde. By our improved process, aliphatic dialdehydes of relatively high molecular weight may be readily obtained.

Thus, for example, when 1,4-dichloro-butane is reacted with magnesium in a suitable solvent to form the Grignard reagent, 1,4-butylene-dimagnesium-chloride is obtained as the primary reaction product. Under favorable conditions, 1-chloro-octylene-8-magnesium-chloride is also obtained as a secondary reaction product. The latter is believed to be formed by reaction of a part of the 1,4-butylene-di-magnesium-chloride with unreacted 1,4-dichloro-butane. The secondary reaction product apparently undergoes further reaction with the magnesium in the reaction mixture to form the 1,8-octylene-di-magnesium-chloride Grignard reagent. Reaction of the 1,4-butylene-di-magnesium chloride and the 1,8-octylene-di-magnesium chloride Grignard reagents in the reaction mixture with ethyl orthoformate yields adipaldehyde-bis-diethylacetal and sebacaldehyde-bis-diethylacetal respectively. Hydrolysis of said acetals under very mild acid conditions results in the formation of free adipaldehyde and sebacaldehyde. The respective acetals are preferably separated from each other by fractionation prior to hydrolysis to avoid subsequent separation after hydrolysis.

The conditions under which the Grignard reaction ordinarily takes place are well known in the art. The Grignard reaction is, of course, a generic one and may be effected employing various halogenated aliphatic compounds such as, for example, chloro-, bromo- and iodo-compounds. In the case of dihalogenated aliphatic compounds, the alkylene group should contain at least four carbon atoms in the chain since with a lesser number of carbon atoms, dehydrohalogenation takes place forming unsaturates or ring compounds and not the desired Grignard reagent. Thus, in addition to 1,4-dichloro-butane, 1,5-dichloro-pentane, 1,6-dichloro-hexane, 1,7-dichloroheptane, 1,8-dichloro-octane, etc. may be employed. Other dihalogenated organic compounds which may be employed as intermediates in the preparation of said diacetals and dialdehydes are alicyclic dihalides such as cyclohexane dichloride and 1,4-dichloromethyl-cyclohexane, aromatic dihalides such as o-, m- or p-dichlorobenzene, 1,4-di-(beta-chloroethyl)benzene. Diethyl ether is normaly employed as the reaction solvent, although other solvents may be employed to replace the ether in whole or in part. We have found that methylal, dipropylformal, or even ethyl orthoformate itself alone or in admixture with any one or more of the solvents mentioned above may be conveniently employed as the reaction solvent.

In order further to illustrate our invention but without being limited thereto, the following examples are given:

Example I

To a mixture of 560 parts by weight of diethyl ether and 112 parts by weight of magnesium shavings are added about 3 parts by weight of ethyl bromide to initiate the desired Grignard reaction and then 256 parts by weight of 1,4-dichlorobutane are added with cooling while continually stirring the reaction mixture. After the latter addition is complete 666 parts by weight of ethyl orthoformate are added over about one-half hour, 660 parts by weight of anhydrous benzene are added and the diethyl ether distilled off, the mixture being maintained under reflux at 65 to 70° C. for 4 hours. When the reaction is completed, the reaction mixture is poured on to crushed ice and the Grignard complex decomposed. Magnesium hydroxy chloride is formed as a by-product. The benzene solution is separated and the water extracted with ether, if desired. The benzene and the ether extracts are dried, the benzene and ether distilled off and the remaining product fractionated. Adipaldehyde bis-diethylacetal is obtained in a yield of 35% of theory. The latter has a boiling point of 186° C. at 63 mm. pressure and the index of refraction $n_D^{25}$ is 1.4215. Hydrolysis under mildly acidic conditions, i. e. a pH of about 6, yields adipaldehyde. Sabacaldehyde bis-diethylacetal is also obtained in a yield of about 10% of theory although the reaction conditions employed are not primarily chosen to favor the coupling reaction whereby said longer chain compound is formed.

The latter has a boiling point of 190 to 193° C. at 53 mm. pressure and an index of refraction of $n_D^{25}$ 1.4320.

Example II

To 70 parts by weight of dry diethyl ether containing 12.5 parts by weight of magnesium turnings are slowly added 57.5 parts by weight of 1,5-pentamethylene dibromide. After all of the magnesium has been dissolved, 76 parts by weight of ethyl orthoformate are slowly added and the reaction mixture heated under reflux for about three hours. The reaction mixture is poured on to ice and the organic layer extracted with ether. The ether extract is dried, the ether evaporated and the residue fractionated. Pimelic aldehyde bis-diethylacetal boiling at 100 to 110° C. at 0.3 mm. pressure is obtained. The acetal may be readily hydrolyzed to free pimelic dialdehyde under mild acidic conditions.

It is to be understood that the foregoing detailed description is given merely by way of illustration and that many variations may be made therein without departing from the spirit of our invention.

Having described our invention, what we desire to secure by Letters Patent is:

1. In a process for the production of bifunctional organic compounds, the steps which comprise converting 1,4-dichlorobutane to the magnesium Grignard reagent at a temperature of about 80 to 100° C., reacting the magnesium Grignard reagent formed with ethyl orthoformate, and separating adipaldehyde - bis - diethylacetal and sebacaldehyde-bis-diethylacetal from the reaction mixture.

2. In a process for the production of bifunctional organic compounds, the steps which comprise converting 1,4-dichlorobutane to the magnesium Grignard reagent at a temperature of about 80 to 100° C., reacting the magnesium Grignard reagent formed with ethyl orthoformate, separating adipaldehyde - bis - diethylacetal and sebacaldehyde-bis-diethylacetal from the reaction mixture, and hydrolyzing said acetals to yield the corresponding dialdehydes.

ALFRED L. MILLER.
BERNARD H. KRESS.

REFERENCES CITED

The following references are of record in the file of this patent:

Post: "The Chemistry of Aliphatic Orthoesters," 1943, pages 96 to 105, Reinhold Publishing Corp.